Aug. 25, 1959    M. S. KRYNAK    2,900,948
WARNING SIGNAL FOR RAIL CAR
Filed May 13, 1957

INVENTOR.
MICHAEL S. KRYNAK
BY
Donald G. Dalton
HIS ATTORNEY

United States Patent Office 2,900,948
Patented Aug. 25, 1959

2,900,948

WARNING SIGNAL FOR RAIL CAR

Michael S. Krynak, Parkville, Minn.

Application May 13, 1957, Serial No. 658,728

2 Claims. (Cl. 116—60)

This invention relates to an improved mechanism for actuating a warning bell on a vehicle.

An object of the invention is to provide an improved actuating mechanism which is driven from a vehicle wheel and sounds a warning bell whenever the wheel is turning in either direction.

A further object is to provide an improved actuating mechanism of the foregoing type which sounds the bell sharply even though the vehicle is moving very slowly.

A more specific object is to provide an improved bell actuating mechanism which is particularly adapted for railroad cars and includes a shaft driven from the car wheel and a clanger lever freely pivoted to the shaft so that the clanger strikes the bell sharply under the force of gravity even though the car is moving slowly.

In accomplishing these and other objects of the invention, I have provided improved details of structure, a preferred form of which is shown in the accompanying drawing, in which.

Figure 1:
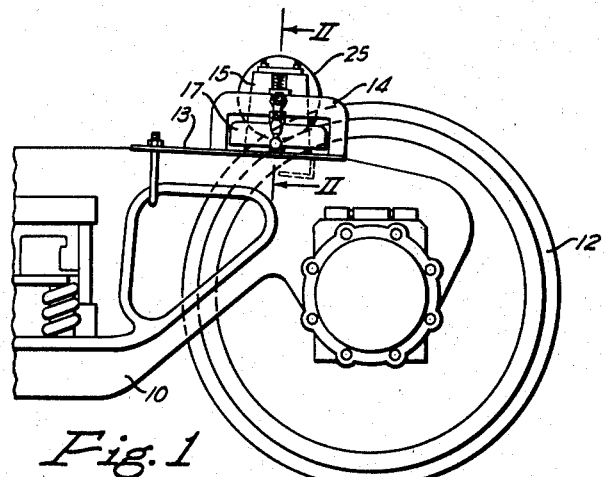
Figure 1 is a front elevational view of a portion of a railroad car truck which carries a bell and actuating mechanism constructed in accordance with my invention.
Figure 2:
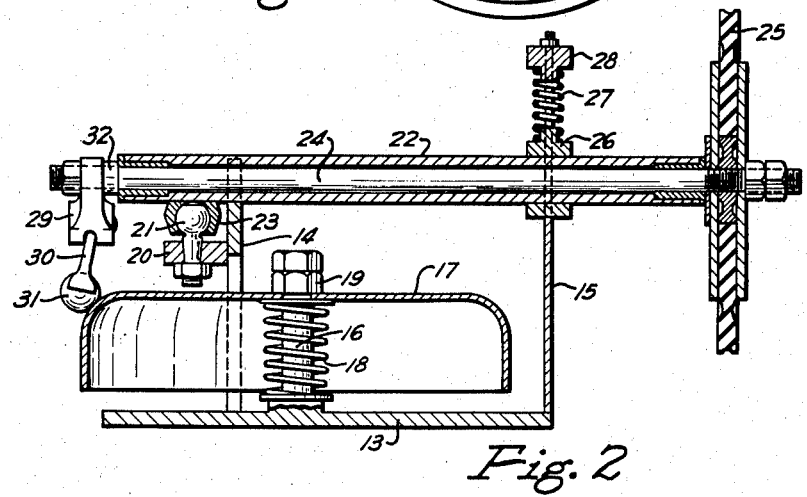
Figure 2 is a vertical section on a larger scale of the bell and its actuating mechanism taken on line II—II of Figure 1.

Figure 1 shows a portion of a conventional railroad car truck which includes a frame 10 and a wheel 12. In accordance with my invention, a bell frame is fixed to the top of the truck frame and includes a base plate 13, an outer arch-shaped upright 14 and an inner upright 15, all rigidly interconnected. The central part of the base plate carries an upright stud 16 on which a vibrating bell 17 is mounted. A compression spring 18 encircles stud 16 and holds the bell against the underside of a nut 19 at the top of the stud, whereby the peripheral portions of the bell are free to vibrate.

An outwardly extending bracket 20 is fixed to the outer upright 14 and carries a ball joint 21. A tubular shaft housing 22 extends across the uprights 14 and 15 and on its underside carries a socket member 23 which is swiveled to said ball joint. A shaft 24 is journaled in housing 22 and at its inner end carries a drive wheel 25 of rubber or the like which bears against the car wheel 12, whereby rotation of the car wheel rotates the shaft. The inner upright 15 carries a vertically movable bearing block 26 through which the shaft housing 22 extends. A compression spring 27 bears against the underside of a fixed bar 28 at the top of the upright 15 and against the upper face of the bearing block 26 and thus urges the shaft housing downwardly about its swivel mounting on the ball joint 21. This action holds the drive wheel 25 in engagement with the car wheel 12 despite wear.

Figure 3:
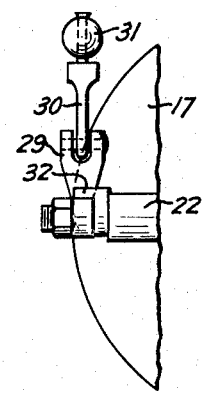
Figure 3 is a fragmentary top plan view of the bell clanger and its mounting.

A clanger lever 29 is freely pivoted to the shaft 24 adjacent the outer end. A clanger rod 30 is pivoted to the outer end of lever 29 and carries a clanger 31 adapted to strike the bell 17. An L-shaped lifter 32 (Figure 3) is fixed to shaft 24 adjacent lever 29 and is adapted to abut either side of the lever as the shaft rotates, depending on the direction of rotation. Thus the lifter raises the lever and clanger until they swing over the top of the shaft. Thereafter they drop under the force of gravity, so that the clanger strikes the bell sharply even though the car is moving slowly.

From the foregoing description it is seen that my invention affords a simple actuating mechanism for sounding a warning bell on a vehicle whenever the vehicle is in motion in either direction. The drive is operated from the vehicle wheel and is maintained in engagement even though parts may wear and become distorted. The bell is sounded sharply even though the vehicle may be moving very slowly.

While I have shown and described only a single embodiment of my invention, it is apparent that other modifications may arise. Therefore, I do not wish to be limited to the disclosure set forth but only by the scope of the appended claims.

I claim:

1. The combination, with a vehicle which includes a frame and a wheel journaled to said frame, of a bell and an actuating mechanism for said bell, said actuating mechanism comprising a second frame fixed to said first named frame, a shaft, means journaling said shaft on said second frame, a wheel on said shaft engaging said first named wheel and rotating said shaft on rotation of said first named wheel in either direction, a lever pivoted to said shaft, a clanger supported by said lever, said bell being fixed to said second frame in the path of said clanger, and a lifter fixed to said shaft and including means in the path of said lever for abutting either side of the lever depending on the direction of wheel and shaft rotation and swinging the clanger and lever over the top of the shaft as the latter rotates so that said clanger strikes said bell under the force of gravity when the vehicle is moving slowly.

2. The combination, with a vehicle which includes a frame and a wheel journaled to said frame, of a bell and an actuating mechanism for said bell, said actuating mechanism comprising a second frame fixed to said first named frame, a housing swiveled to said second frame, a shaft journaled in said housing, a wheel on said shaft engaging said first named wheel and rotating said shaft on rotation of said first named wheel in either direction, a spring acting against said housing and said second named frame and maintaining said wheels in engagement, a lever pivoted to said shaft, a clanger supported by said lever, said bell being fixed to said second frame in the path of said clanger, and a lifter fixed to said shaft and including means in the path of said lever for abutting either side of the lever depending on the direction of wheel and shaft rotation and swinging the clanger and lever over the top of the shaft as the latter rotates so that said clanger strikes said bell under the force of gravity when the vehicle is moving slowly.

References Cited in the file of this patent

UNITED STATES PATENTS 391,108    Atkinson _____ Oct. 16, 1888

FOREIGN PATENTS 28,477    Great Britain _____ 1902